United States Patent
Gianvittorio (10) Patent No.: US 10,379,203 B2
(45) Date of Patent: Aug. 13, 2019

(54) METHODS AND APPARATUS FOR MOBILE PHASED ARRAY SYSTEM

(71) Applicant: RAYTHEON COMPANY, Waltham, MA (US)

(72) Inventor: John P. Gianvittorio, Torrance, CA (US)

(73) Assignee: RAYTHEON COMPANY, Waltham, MA (US)

( * ) Notice: Subject to any disclaimer, the term of this patent is extended or adjusted under 35 U.S.C. 154(b) by 360 days.

(21) Appl. No.: 14/727,889

(22) Filed: Jun. 2, 2015

(65) Prior Publication Data
US 2018/0074172 A1  Mar. 15, 2018

(51) Int. Cl.
| | |
|---|---|
| *G01S 7/36* | (2006.01) |
| *H01Q 1/28* | (2006.01) |
| *H01Q 3/26* | (2006.01) |
| *H01Q 21/00* | (2006.01) |
| *H01Q 3/34* | (2006.01) |

(52) U.S. Cl.
CPC .............. *G01S 7/36* (2013.01); *H01Q 1/28* (2013.01); *H01Q 3/26* (2013.01); *H01Q 3/34* (2013.01); *H01Q 21/0025* (2013.01)

(58) Field of Classification Search
CPC .......................... G05D 1/104; G01S 13/9035
USPC ............................... 342/25 R–25 F
See application file for complete search history.

(56) References Cited

U.S. PATENT DOCUMENTS

| | | | | |
|---|---|---|---|---|
| 5,521,817 A | * | 5/1996 | Burdoin | G05D 1/0027 244/190 |
| 5,728,965 A | * | 3/1998 | Fesland | B64C 39/024 244/190 |
| 5,896,105 A | | 4/1999 | Murphy et al. | |
| 6,507,739 B1 | | 1/2003 | Gross et al. | |
| 6,926,233 B1 | * | 8/2005 | Corcoran, III | B64C 13/20 244/76 R |
| 6,963,795 B2 | * | 11/2005 | Haissig | G08G 5/0008 342/104 |
| 7,051,636 B1 | | 5/2006 | Snow et al. | |
| 8,077,083 B2 | * | 12/2011 | Blake | H01Q 3/267 342/357.34 |
| 8,089,395 B2 | | 1/2012 | Blake | |

(Continued)

FOREIGN PATENT DOCUMENTS

| | | |
|---|---|---|
| WO | WO 2007/059508 A1 | 5/2007 |
| WO | WO 2014/068081 A1 | 5/2014 |

OTHER PUBLICATIONS

F. Namin, J. S. Petko and D. H. Werner, "Design of robust aperiodic antenna array formations for micro-UAV swarms," 2010 IEEE Antennas and Propagation Society International Symposium, Toronto, ON, 2010, pp. 1-4.*

(Continued)

*Primary Examiner* — Marcus E Windrich
(74) *Attorney, Agent, or Firm* — Daly, Crowley, Mofford & Durkee, LLP (57) ABSTRACT

Method and apparatus for a phased array system including a plurality of unmanned aerial vehicles (UAVs) configured to fly in an array formation having an array lattice spacing. The UAVs can include a puck having a phased array element and a signal processing module configured to receive and process a signal to achieve for the array lattice spacing a spacing that is less than a wavelength of operation of the phased array elements.

16 Claims, 9 Drawing Sheets

(56) References Cited

U.S. PATENT DOCUMENTS

| | | | |
|---|---|---|---|
| 8,781,727 B1* | 7/2014 | Bonawitz | G05D 1/104 |
| | | | 701/410 |
| 9,104,201 B1* | 8/2015 | Pillai | B64C 39/024 |
| 9,513,371 B2* | 12/2016 | Zhang | B64C 39/024 |
| 9,599,994 B1* | 3/2017 | Bogdanowicz | G05D 1/104 |
| 9,682,777 B2* | 6/2017 | Tofte | B64C 39/024 |
| 2004/0030571 A1* | 2/2004 | Solomon | F41H 13/00 |
| | | | 700/248 |
| 2006/0163349 A1* | 7/2006 | Neugebauer | G06Q 20/387 |
| | | | 235/383 |
| 2009/0091492 A1* | 4/2009 | Sanyal | G01S 7/36 |
| | | | 342/25 C |
| 2012/0013498 A1 | 1/2012 | Hilliard et al. | |
| 2012/0146852 A1* | 6/2012 | Park | G01S 7/292 |
| | | | 342/385 |
| 2012/0188125 A1 | 7/2012 | Pomietlasz | |
| 2014/0269785 A1 | 9/2014 | Branlund et al. | |
| 2014/0269856 A1 | 9/2014 | Gianvittorio et al. | |
| 2015/0276917 A1* | 10/2015 | Dawber | G01S 7/003 |
| | | | 342/25 A |
| 2016/0046387 A1* | 2/2016 | Frolov | H04B 7/18506 |
| | | | 244/59 |

OTHER PUBLICATIONS

PCT International Search Report and Written Opinion dated May 6, 2016 corresponding to International Application No. PCT/US2016/018412; 17 Pages.

Petko et al., "Positional Tolerance Analysis and Error Correction of Micro-UAV Swarm Based Antenna Arrays;" Proceedings of the 2009 IEEE Antennas and Propagation Society International Symposium; Jun. 1, 2009; 4 Pages.

Tonetti et al., "Distributed Control of Antenna Array with Formation of UAVs;" Proceedings of the 18$^{th}$ World Congress International Federation of Automatic Control (IFAC), vol. 18; Aug. 28, 2011; pp. 7848-7853; 6 Pages.

International Preliminary Report on Patentability dated Dec. 14, 2017 from International Application No. PCT/US2016/018412; 12 Pages.

* cited by examiner

| | | |
|---|---|---|
| BW | 5.60E+07 | Hz |
| c | 3.00E+08 | m/s |
| range resol | 2.68 | m |
| range resol | 8.787964 | ft |
| | | |
| fc | 0.8 | GHz |
| fc | 800000000 | Hz |
| lambda | 1.230 | ft |
| lambda | 0.375 | m |
| | | |
| D | 8.690 | m |
| beamwidth | 3.021 | degs |
| | | |
| alt | 500 | ft |
| alt | 152.4 | m |
| | | |
| spot width | 26.367 | ft |
| alt | 8.037 | m |
| | | |
| elem spacing | 0.55 | wavelengths |
| elem spacing | 0.677 | ft |
| elem spacing | 0.206 | m |
| elem spacing | 8.120 | in |
| # of elems, long | 43 | |
| # of elems, wide | 4 | |

METHODS AND APPARATUS FOR MOBILE PHASED ARRAY SYSTEM

BACKGROUND

As is known in the art, there exist a variety of rapidly deployable antennas, such as inflatable dish antennas which are typically deployed on the ground. However, such antennas remain in a fixed position and have limited scalability and transportability. In addition, conventional rapidly deployable antenna systems may have limited scan capability, weather issues, and less than robust survivability.

SUMMARY

Embodiments of the invention provide a rapidly deployable phased array system having relatively compact unmanned aerial vehicles (UAVs) capable of flying in a formation with an array lattice spacing. In one embodiment, the UAVs comprise battery-powered quadcopters. In embodiments, the UAVs include a puck having a phased array element capable of operating in a range of wavelengths. A remote beacon generating station can provide a reference beacon to enable the UAVs to navigate to the desired array element lattice spacing. In illustrative embodiments, the array lattice spacing is less than the wavelength of operation of the phased array elements. In alternative embodiments, the UAVs include a Global Positioning Receiver (GPS) unit for synchronizing the phased array elements.

Embodiments of the invention provide a rapidly deployable, scalable and dynamically reconfigurable phased array system. In embodiments, the phased array system can be transported via one or more backpacks. The phased array system enables high speed wireless communications, radar operations, and the like. System operation can be dynamically configured for a particular mission, terrain, weather condition, etc. In embodiments, battery-powered UAVs can be rotated in and out via a changing station to reduce or eliminate down time of the system.

In one aspect of the invention, a phased array system comprises: a plurality of unmanned aerial vehicles (UAVs) configured to fly in an array formation having an array lattice spacing, the UAVs comprising: a puck having a phased array element; and a signal processing module configured to receive and process a signal to achieve for the array lattice spacing a spacing that is less than a wavelength of operation of the phased array elements.

The system can further include one or more of the following features: the UAVs comprise multi-rotor copters, the puck comprises a phased locked loop system to process the received signal for synchronizing the phased array elements, the puck comprises a transceiver configured to provide a wireless data downlink and a connection to the phase locked loop system, the array lattice spacing is configured to be less than or equal to 0.5 of the wavelength of operation, the system comprises a phased array radar, the system comprises an anti-jammer, and or the system comprises a communication system.

In another aspect of the invention, a method of providing a phased array system comprises: providing commands to a plurality of unmanned aerial vehicles (UAVs) to fly in an array formation having an array lattice spacing, the UAVs comprising: a puck having a phased array element; and a signal processing module configured to receive and process a signal to achieve for the array lattice spacing a spacing that is less than a wavelength of operation of the phased array elements.

The method can further include one or more of the following features: the UAVs comprise multi-rotor copters, the puck comprises a phased locked loop system to process the received signal for synchronizing the phased array elements, the puck comprises a transceiver configured to provide a wireless data downlink and a connection to the phase locked loop system, the array lattice spacing is configured to be less than or equal to 0.5 of the wavelength of operation, the system comprises a phased array radar, the system comprises an anti-jammer, and or the system comprises a communication system.

In a further aspect of the invention, a system comprises: a controller; and a means for providing a hovering phased array radar configured for wireless communication with the controller, the means for providing a hovering phased array radar having an array lattice spacing and comprising: a puck having a phased array element; and a signal processing module configured to receive and process a signal to achieve for the array lattice spacing a spacing that is less than a wavelength of operation of the phased array elements.

The system can further include one or more of the following features: the puck comprises a phased locked loop system to process the received signal for synchronizing the phased array elements, the puck comprises a transceiver configured to provide a wireless data downlink and a connection to the phase locked loop system, the array lattice spacing is configured to be less than or equal to 0.5 of the wavelength of operation, the system comprises a phased array radar, the system comprises an anti-jammer, and or the system comprises a communication system.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 is a schematic representation of a transceiver portion of the puck of FIG. 3a;

DETAILED DESCRIPTION

Figure 1:
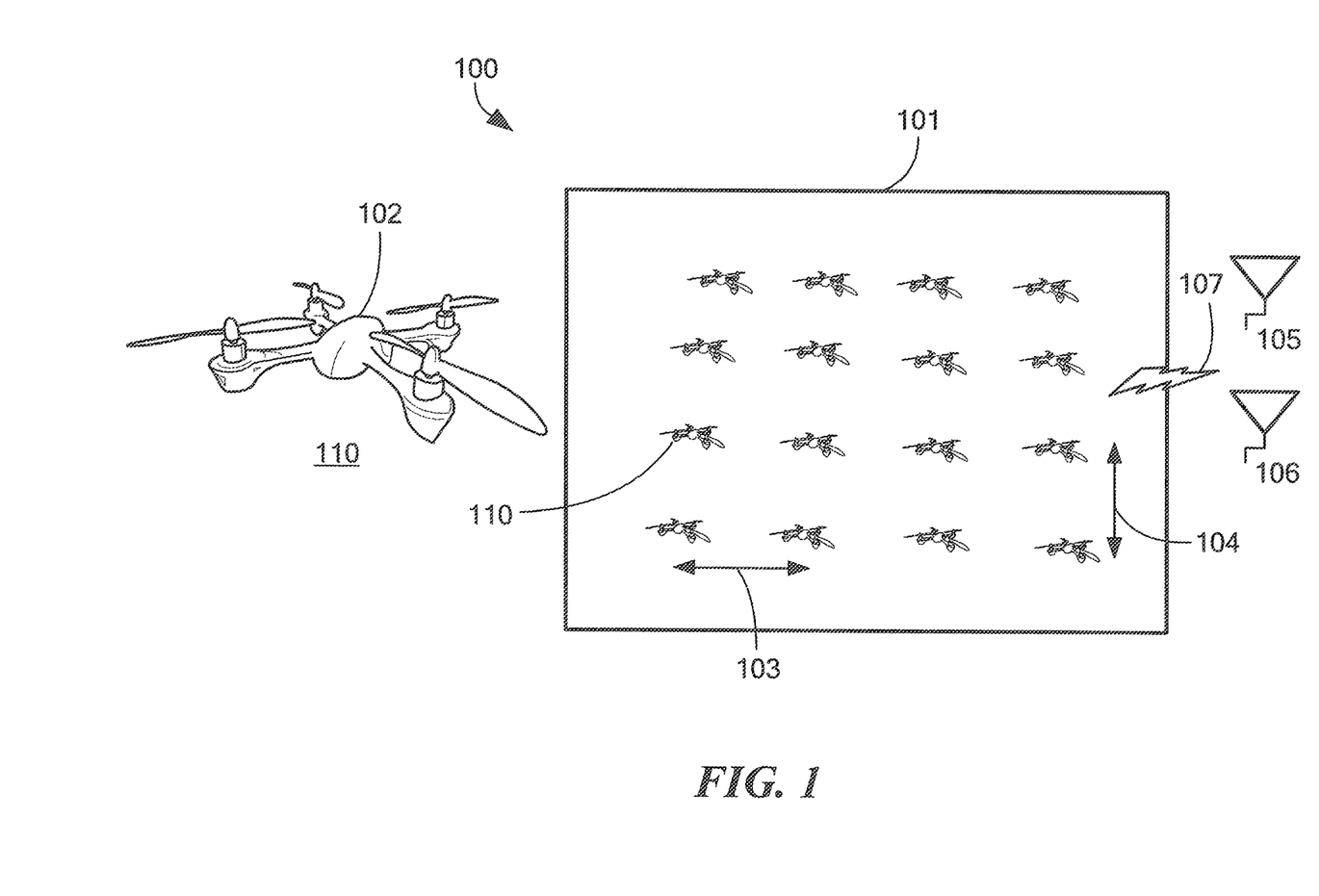
FIG. 1 is a schematic representation of a phased array radar system.

FIG. 1 shows a phased array system 100 operating in a deployment area 101 where unmanned aerial vehicles (UAVs) 110, shown as multi-rotor copters, are deployed in an array formation of a desired lattice size and array shape. A quad-copter 110 having an onboard RF puck 102 provides nodes/elements of a phased array system.

An array lattice spacing includes a first lattice spacing 103, which is shown as horizontal, and a second lattice spacing 104, which is shown as vertical. The lattice spacing of the array elements should be maintained as the UAVs 110 move in the air for proper operation of the phased array elements provided by the onboard pucks 102. The UAVs 110 should move in a coherent manner through space. In embodiments, the horizontal 103 and vertical 104 lattice spacing is kept under a wavelength λ used by the phased array elements. In one embodiment, a wavelength of less than λ/2 is used.

It is understood that a phased array comprises an array of antennas in which the relative phases of the respective signals feeding the antennas are controlled to provide an effective radiation pattern of the array in a desired direction and suppressed in undesired directions. The antenna element phase relationships may be fixed or adjustable to provide beam steering. Operation of phased array radars and communication systems are well known to one of ordinary skill in the art.

The pucks 102 enable wireless communication 107 to provide data-links 106 to a remote station and to receive a beacon reference signal 105. The reference beacon signal 105 can be generated by a beacon generator 350 (FIG. 3B) that can be located in a nearby protected zone on the ground or on a nearby aircraft or on a sea vessel. The beacon generator 350 also can be positioned by mobile personnel or can be carried by a vehicle, such as aircraft, a vessel, or an independently controlled UAV.

In embodiments, the onboard pucks 102 include a phase locked loop (PLL) to synchronize the pucks to the beacon signal 105. The PLL of the pucks 102 enable coherent spacing and movement of the UAVs.

In general, each UAV receives instructions for achieving a desired lattice spacing and phased array operation, e.g, signal transmit and receive, signal frequency, beamforming etc. In embodiments of the invention, each UAV/copter provides a single element in the phased array where the geometrical arrangement of the copters is accomplished using station keeping controls in a manner known in the art. The copters can be commanded to maintain a set position offset from an object in view of an onboard camera, for example. A first copter in the array is commanded to a position at a given offset from a beacon. The next copter is commanded to position itself relative to the first copter, and so on, until all the copters are positioned in their desired location. In one embodiment, the copters are positioned in relation to a fixed two-dimensional grid with a specified spacing.

In embodiments, each UAV/copter has an onboard transceiver and antenna element. In transmit mode, each transceiver is commanded to radiate a waveform with a specified amplitude and phase shift based on its position in the array to form a phased array beam pointing in the desired direction. In receive mode, each transceiver receives a signal and applies a phase and amplitude weight based on its position. Each transceiver sends its data over a wireless link to the base station for summing with the signals from the other copters. It is understood that transmitting and receiving signals in a phased array system are well known in the art.

In general, each element in the array can transmit at a power up to the limit provided by the onboard battery. In one particular embodiment, the range is in the order of up to 100 mW per element. It is understood that the directivity of the array is dependent on the number of copters and their arrangement. It is further understood that as used herein "coherent" refers to the phase reference for each of the elements being aligned to a suitable tolerance, such as within 15 degrees of each other. In embodiments, the phased array hovers in place. It is contemplated that the phased array can move while providing transmit and receive capability.

In general, in receive mode, each transceiver receives a signal and applies a phase and amplitude weight based on its position and desired beam characteristics, such as steer angle and sidelobe control. In embodiments, this is calculated for each element at a base station and transmitted to the UAV. Each transceiver sends its data over a wireless link to the base station to be summed to all the other signals from the other copters.

The system 100 can be rapidly deployed and configured for a desired operation, such as radar imaging systems, anti-jamming systems, and electronic warfare (EW) systems. The UAV-mounted RF radiators enable composable and flexible systems that can be shared by users of communication systems.

While illustrative embodiments of the invention are shown in conjunction with UAVs in the form of quadcopters, it is understood that any suitable UAV can be used. For example, lighter than air (LTA) vehicles can be used in larger lattice size systems. Other systems can include drones having mounted array elements to meet the needs of a particular application.

Figure 2:
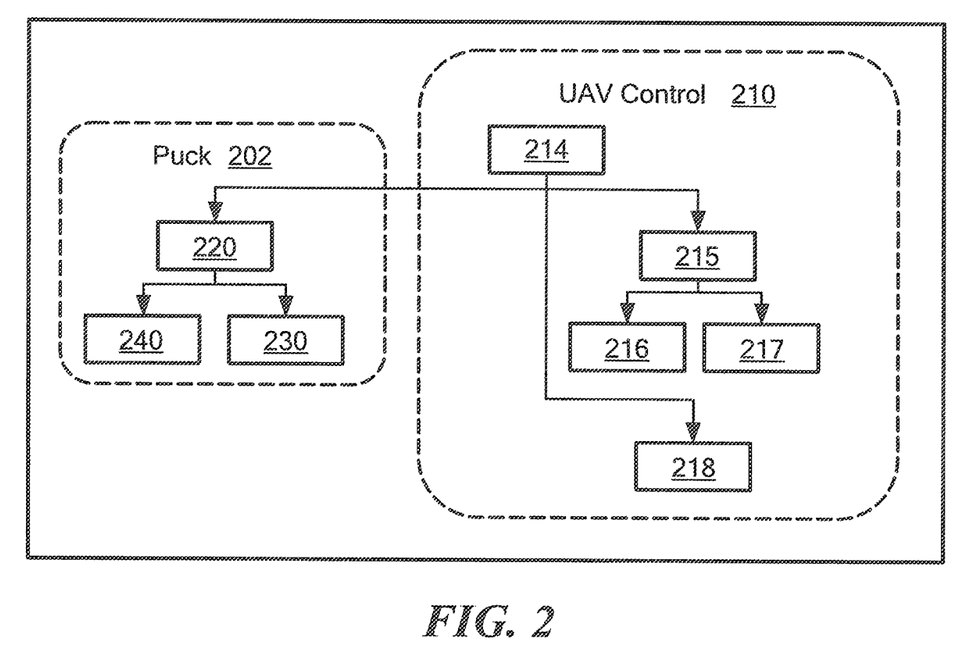
FIG. 2 is a schematic block diagram of a UAV forming a part of the system of FIG. 1.

FIG. 2 shows an illustrative quadcopter 200 including a battery 214, rotors 215, radio and communication (R/C) receiver 216, control systems 217, and electro-optic subsystems such as a camera (218). The RF puck 202 provides signal transmit and receive functionality for a phased array system. The puck 202 includes a transmit/receive subsystem 220, a datalink interface 230 and a PLL subsystem 240.

Figure 3A:
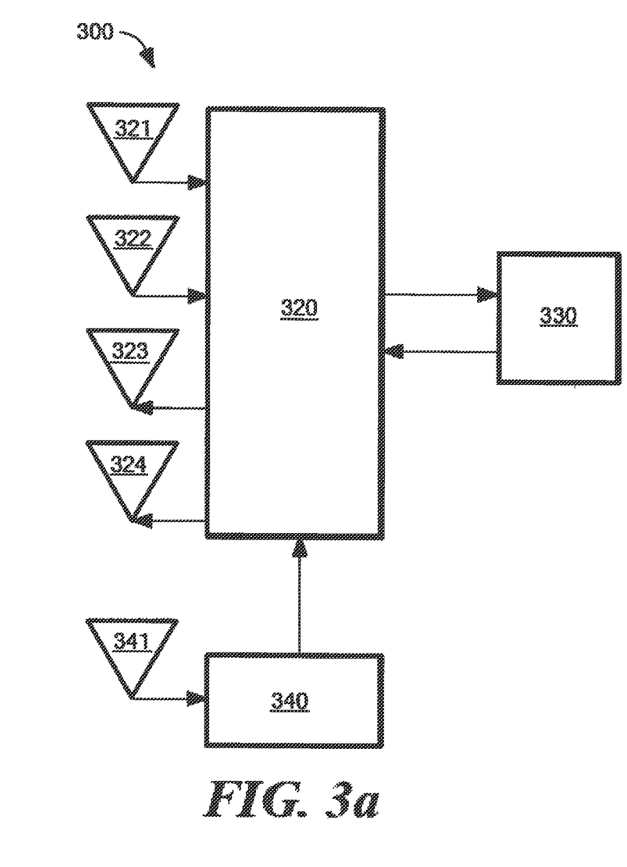
FIG. 3a is a schematic representation of a puck forming a part of the UAV of FIG. 2.
Figure 3B:
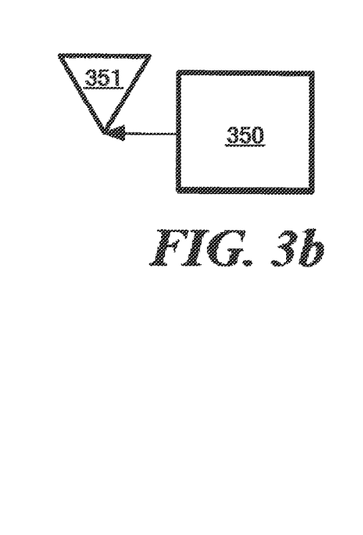
FIG. 3B is a schematic representation of a beacon system for synchronizing the pucks of FIG. 2.

FIG. 3a shows an illustrative puck 300 including a RF transceiver subsystem 320 connected to a programmable datalink subsystem 330 and a PLL subsystem 340. FIG. 3b shows a beacon generator 350 including a transmit antenna 351 to transmit a beacon signal. The transceiver subsystem 320 includes a RF receive antenna 321, a receive communication antenna 322, a RF transmit antenna 323, and a transmit communication antenna 324. The transceiver subsystem 320 receives and transmits radar waveforms that are synchronized to a beacon by the PLL subsystem 340. The PLL subsystem 340 includes a beacon receive antenna 341 is attached to the PLL subsystem 340.

The datalink subsystem 330 interfaces with the transceiver subsystem 320 and the PLL subsystem 340 and provides datalink interface with a remote ground station or an airborne or shipboard platform. The datalink subsystem 330 generates wave-forms to support various missions.

The beacon generator 350 of FIG. 3B can be located at any suitable location within range of the UAVs. The beacon generator 350 can be positioned by mobile personnel or carried by a vehicle, such as an aircraft or vessel, or an independently controlled UAV. The beacon generator 350 generates a beacon at a selected frequency that is used for synchronizing the phased array and providing coherent element spacing for the phased array aperture.

Figure 4:
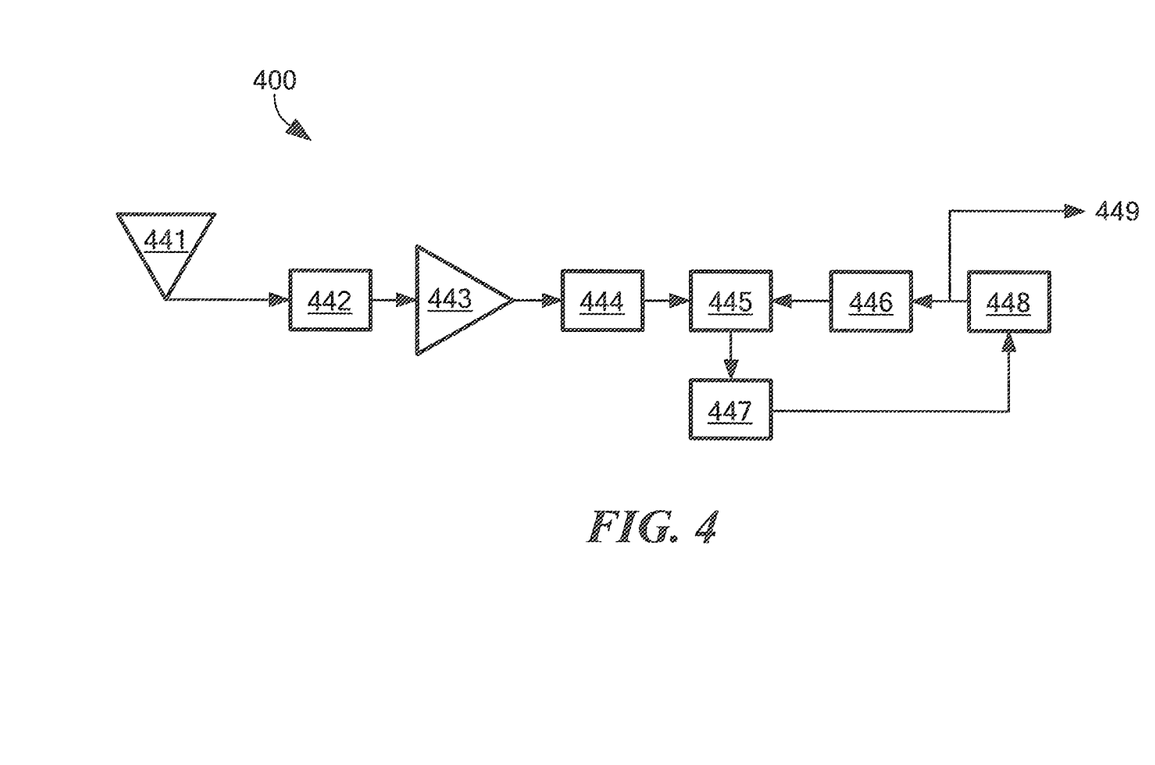
FIG. 4 is a schematic representation of a synchronization system including a Phased Locked Loop (PLL) circuit for enabling puck synchronization using a beacon signal.

FIG. 4 shows an illustrative PLL system 400 of the puck. The PLL system 400 comprises a beacon signal receive antenna 441 connected to a band pass filter (BPF) 442 the output of which is provided to a RF amplifier 443. The output of the RF amplifier 443 is fed to a "divide by N" circuit 444 which is then fed to a phase detection/comparison circuit 445. The phase locked loop includes a local oscillator 448, which is then passed through a divide by M circuit 446 and fed back to the phase detection/comparison circuit 445 for comparing the phases to lock into the beacon signal frequency and phase. Filter 447 filters an output of the comparison circuit 445 for output to the local oscillator 448. Other embodiments and variations of the illustrated PLL subsystem can be expanded by one in the art and are anticipated by this disclosure.

Figure 5:
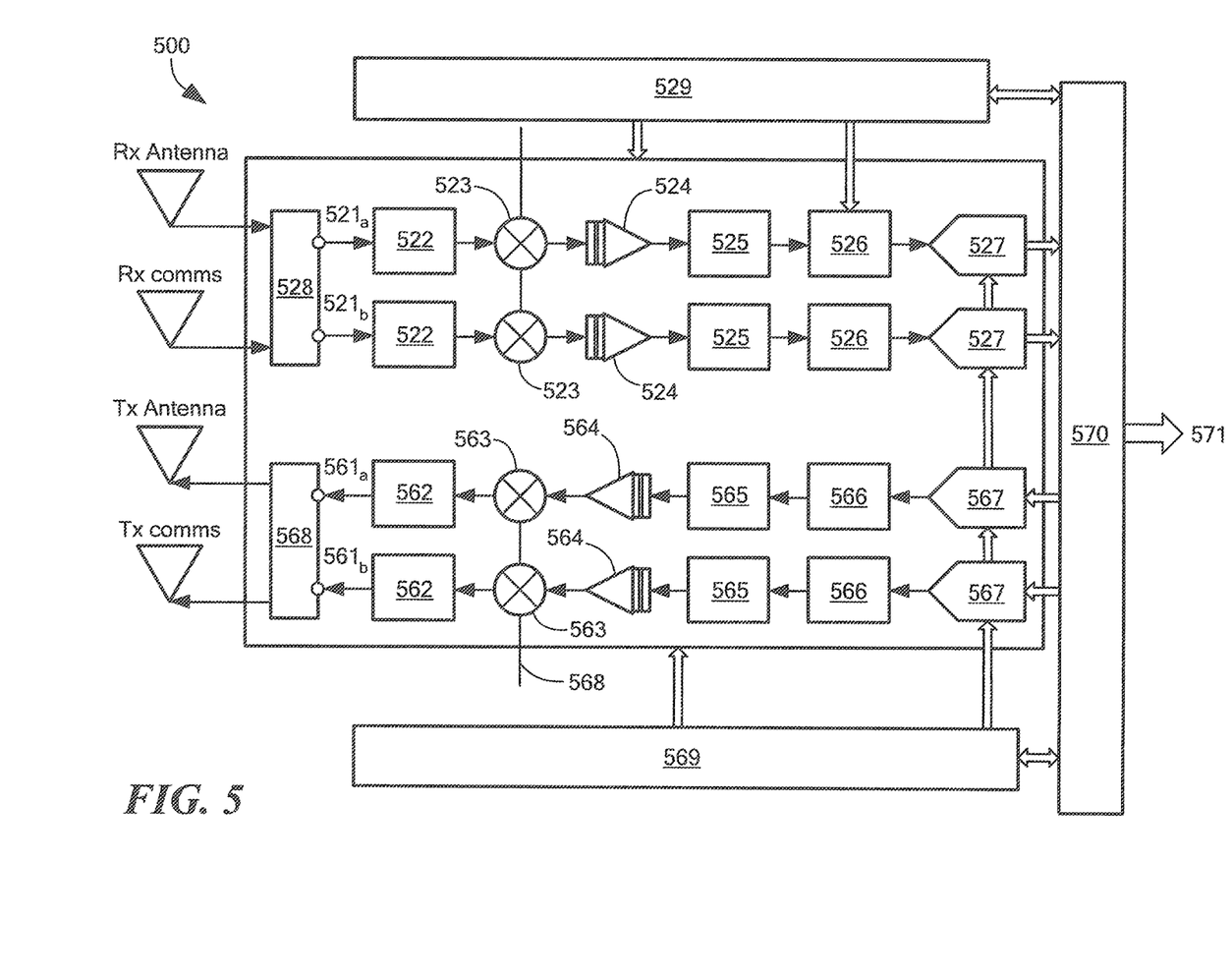

FIG. 5 shows an illustrative agile RF transceiver system 500 within the puck. A transmit front-end 568 and a receive front-end 528 respectively interface to the transmit and receive antennas. PLL circuits 569 and control circuits 529 provide control and synchronization. Digitized data is buffered and transported (in or out as appropriate) by a data subsystem 570 that interfaces 571 to a datalink subsystem, which can be provided in a FPGA. Inside the transceiver subsystem, parallel paths for differential RF inputs and parallel I/Q output paths are provided. These parallel paths on the receive side comprises receive amplifiers 522 that provide amplification of the differential RF inputs before mixing (523) with receive local oscillator output (RX LO). This is fed to a series of amplifiers 524 to provide for Automatic Gain Control (AGC). DC offset correction, quadrature correction and digital filtering elements can be done in the block 525 before feeding the output to the frequency synthesizing block 526. The output of the frequency synthesizer block 526 is then fed to an ADC (Analog to Digital Convertor) 527. The digitized output is then fed to the data buffering block 570 that interfaces with the programmable data link system.

The transmit paths illustrated in this embodiment 500 of the transmit/receive subsystem is similar to the receive side described above. The analog output of the DAC (Digital to analog converter) is fed to the frequency synthesizer 566 which is then fed to a phase correction/filtering block 525. The output of 525 is fed to an AGC unit 564 which is then input to the mixer for carrier mixing with the Transmit Local Oscillator (Tx/LO) 563. This is further amplified by amplifiers 562 before feeding transmit front-end 568. Transmit antennas are connected to this transmit front-end 568.

In illustrative embodiments, the transceiver can be provided as Analog Devices Part No. AD9361 and the datalink interface can be provided as a programmable FPGA made by Enclustra.

It is understood that the transmit and receive functionality can be provided in a variety of alternative embodiments known to those of ordinary skill in the art of radar signal processing. Other elements can be added or removed for performance or cost reasons. The choice of components and level of integration may be dictated by the lattice spacing and frequency. In general, the UAV should be sized to enable operation less than a wave-length, or less than half a wavelength of operation to avoid multi-static grading lobes.

Figure 6:
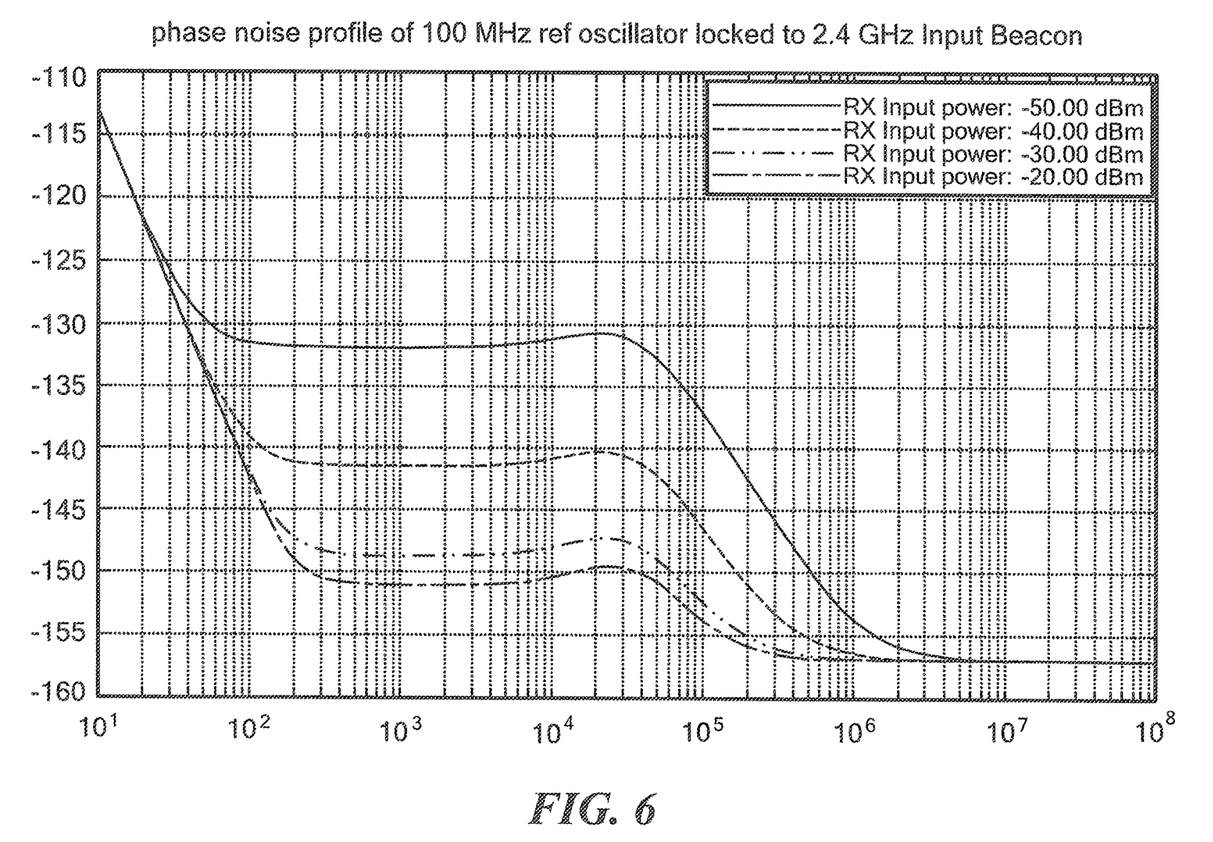
FIG. 6 is a graphical representation of simulated phase noise performance for a 2.4 GHz beacon phase locked to a puck using a 100 MHz reference oscillator.

FIG. 6 illustrates phase noise performance of a simulated embodiment for frequency of operation versus input receive power using a 100 MHz reference local oscillator locked to a 2.4 GHz beacon signal. As can be seen, the phase noise is acceptable when the input receive power varies from about −50 dbm to about −20 dbm.

Figure 7A:
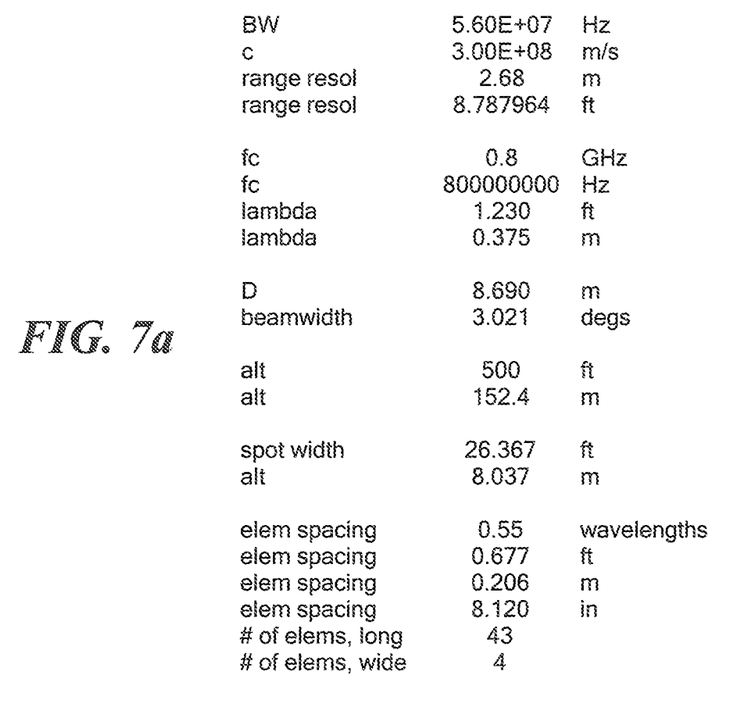
FIGS. 7a-7d show simulated performance parameters for an illustrative phased array system.
Figure 7B:
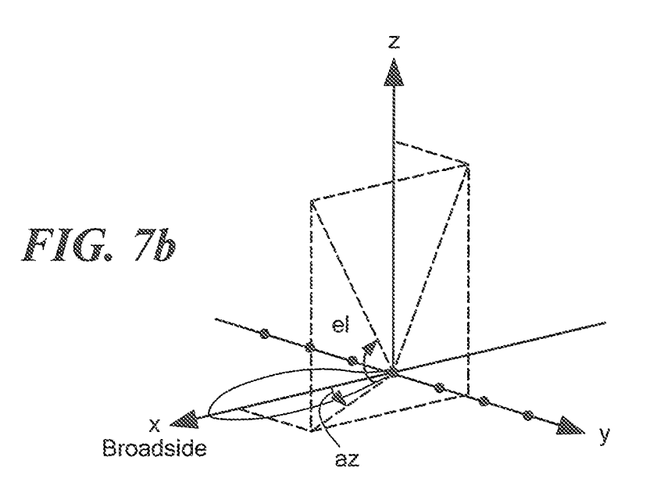
Figure 7C:
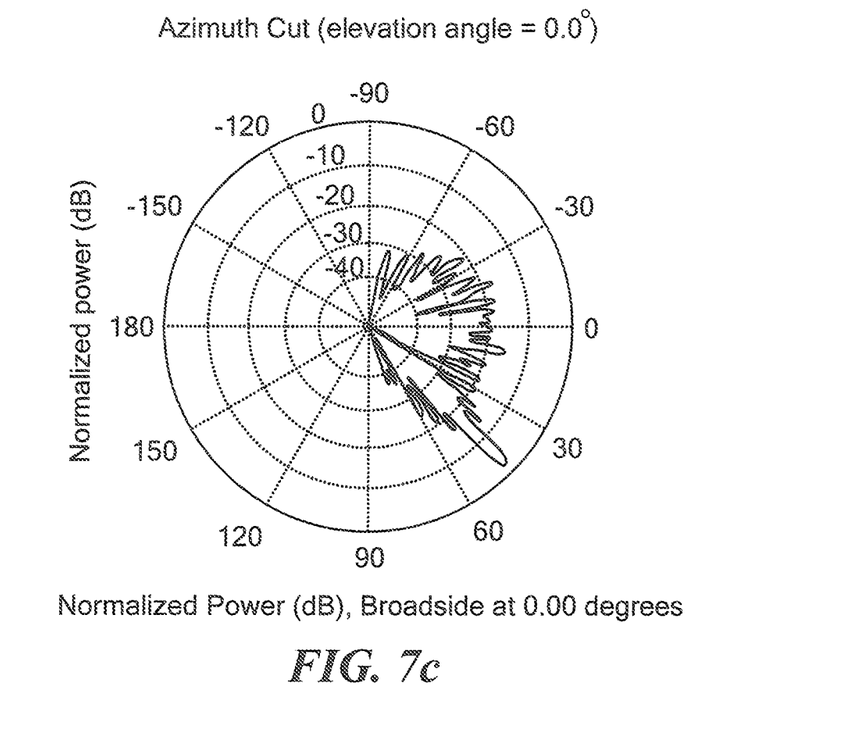
Figure 7D:
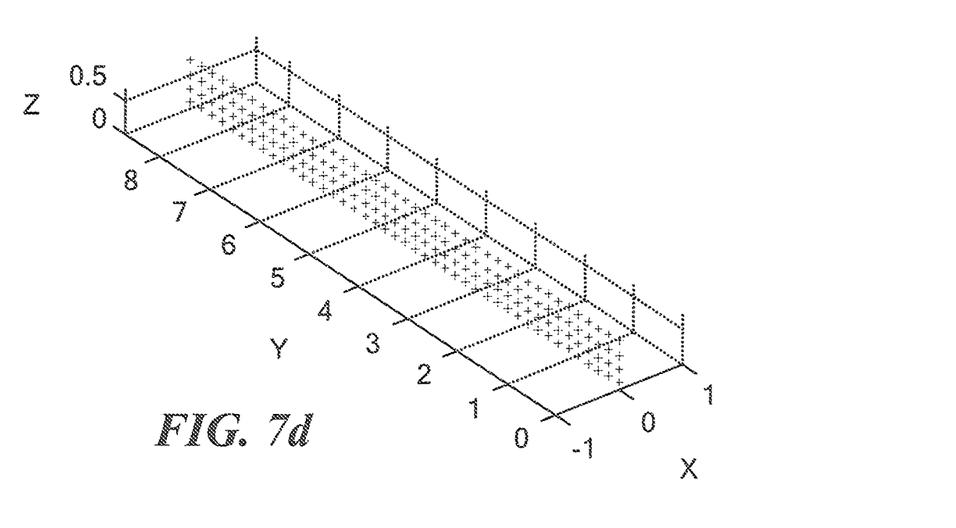

FIGS. 7a-d show simulation results for the parameters listed in FIG. 7a. Operation at 0.8 GHz corresponds to a wavelength λ of 0.375 meters. A 0.55 wavelength spacing wavelengths results in an element spacing of 0.206 meters (0.55×0.375). The illustrative simulation comprises a 43 by 4 element array, as shown in FIG. 7d. For the example array, 2.68 meter range resolution using a 0.8 GHz frequency is provided, as shown in FIG. 7a. FIG. 7b illustrates range resolution for azimuth (az) and elevation (el) from array broadside. FIG. 7c illustrates normalized power distribution along the azimuth direction.

Figure 8:
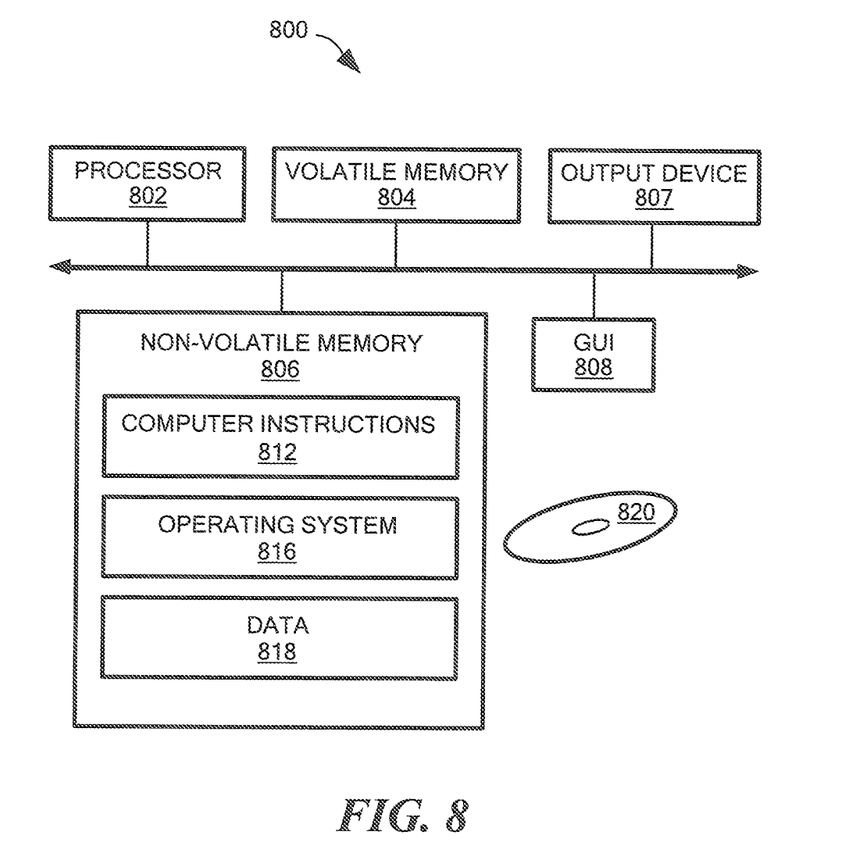
FIG. 8 is a schematic representation of an illustrative computer that can perform processing described herein.

FIG. 8 shows an exemplary computer 800 that can perform at least part of the processing described herein. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A phased array system comprising:
a first plurality of first unmanned aerial vehicles (UAVs) configured to fly in an array formation having an array lattice spacing, each respective first UAVs comprising:
a puck including a data link system, a phased array element, and a phased locked loop system, the phased locked loop system including a beacon receive antenna, the phased locked loop system being configured to receive a beacon signal via the beacon receive antenna and process the beacon signal to achieve for the array lattice spacing a spacing that is less than a wavelength of operation of the phased array element, and the phased array element being configured to transmit a radar waveform that is synchronized to the beacon signal that is received by the phased locked loop system via the beacon receive antenna,
wherein the phased array element includes a pair of parallel processing paths, each of the parallel processing Paths being configured to: (i) digitize a respective portion of a received differential signal to produce signal data, and (ii) store the signal data in a buffer that is shared by the parallel processing paths for use by the data link system, and
wherein the first plurality of first UAVs is configured to form a phased array antenna when flying in the array formation, with each of the first UAVs carrying a different phased array element of the phased array antenna, such that: (i) the spacing between the phased array elements of the phased array antenna is set based on the beacon signal, and (ii) radar waveforms transmitted from the phased array antenna are synchronized based on the beacon signal.

2. The system of claim 1, wherein at least a portion of the first UAVs comprise multi-rotor copters.

3. The system of claim 1, wherein the puck is configured to provide a wireless data downlink.

4. The system of claim 1, wherein the array lattice spacing is configured to be less than or equal to 0.5 of the wavelength of operation.

5. The system of claim 1, wherein the system comprises at least one of a phased array radar, an anti-jammer, and a communications system.

6. A method of providing a phased array system comprising:
receiving commands at a first plurality of first unmanned aerial vehicles (UAVs), the commands configured to cause the first plurality of first UAVs to fly in an array formation having an array lattice spacing, each respective UAVs comprising:
a puck including a data link system, a phased array element and a phased locked loop system, the phased locked loop system including a beacon receive antenna, the phased locked loop system being configured to receive a beacon signal via the beacon receive antenna and process the beacon signal to achieve for the array lattice spacing a spacing that is less than a wavelength of operation of the phased array element, and the phased array element being configured to transmit a radar waveform that is synchronized with the beacon signal by the phased locked loop system,
wherein the phased array element includes a pair of parallel processing paths, each of the parallel processing paths being configured to: (i) digitize a respective portion of a received differential signal to produce signal data, and (ii) store the signal data in a buffer that is shared by the parallel processing paths for use by the data link system, and
wherein the first plurality of first UAVs is configured to form a phased array antenna when flying in the array formation, with each of the first UAVs carrying a different phased array element of the phased array antenna, such that: (i) the spacing between the phased array elements of the phased array antenna is set based on the beacon signal, and (ii) radar waveforms transmitted from the phased array antenna are synchronized based on the beacon signal.

7. The method of claim 6, wherein at least a portion of the first UAVs comprise multi-rotor copters.

8. The method of claim 6, wherein the puck is configured to provide a wireless data downlink.

9. The method of claim 6, wherein the array lattice spacing is configured to be less than or equal to 0.5 of the wavelength of operation.

10. The method of claim 6, wherein the system comprises at least one of a phased array radar, an anti-jammer, and a communication system.

11. A system, comprising:
a controller; and
a means for providing a hovering phased array radar configured for wireless communication with the controller, the means for providing a hovering phased array radar having an array lattice spacing and comprising:
a puck including a data link system, a phased array element and a phased locked loop system, the phased locked loop system including a beacon receive antenna, the phased locked loop system being configured to receive a beacon signal via the beacon receive antenna and process the beacon signal to achieve for the array lattice spacing a spacing that is less than a wavelength of operation of the phased array element, and the phased array element being configured to transmit a radar waveform that is synchronized with a beacon signal that is received by the phased locked loop system via the beacon receive antenna,
wherein the phased array element includes a pair of parallel processing paths, each of the parallel processing paths being configured to: (i) digitize a respective portion of a received differential signal to produce signal data, and (ii) store the signal data in a buffer that is shared by the parallel processing paths for use by the data link system,
wherein the array lattice spacing of the phased array radar is based on the beacon signal, and
wherein radar waveforms transmitted from the phased array radar are synchronized based on the beacon signal.

12. The system of claim 11, wherein the beacon signal comprises a signal provided by an independently controlled UAV.

13. The system of claim 1, further comprising a second UAV that is independently controllable, the second UAV being configured to transmit to the first plurality of first UAVs the beacon signal to enable the first plurality of first UAVs to navigate to the array lattice spacing.

14. The method of claim 6, further comprising moving the phased array system formed by the first plurality of first UAVs through space while phased array system transmits and receives.

15. The system of claim 1, wherein the beacon signal comprises a signal provided by a second, independently controlled UAV.

16. The method of claim 6, wherein the beacon signal comprises a signal provided by a second, independently controlled UAV.

* * * * *